United States Patent [19]

Murooka et al.

[11] Patent Number: 5,368,932
[45] Date of Patent: Nov. 29, 1994

[54] BIAXIALLY ORIENTED POLYESTER FILM FOR MAGNETIC RECORDING MEDIA CONTAINING THETA OR MIXED ALPHA PLUS GAMMA ALUMINUM OXIDE AND INERT ORGANIC PARTICLES

[75] Inventors: Hirofumi Murooka, Sagamihara; Sumio Kato, Hachioji; Masami Etchu, Yokohama, all of Japan

[73] Assignee: Teijin Limited, Osaka, Japan

[21] Appl. No.: 74,593

[22] Filed: Jun. 11, 1993

Related U.S. Application Data

[63] Continuation-in-part of Ser. No. 806,288, Dec. 31, 1991, Pat. No. 5,252,388.

[30] Foreign Application Priority Data

Dec. 13, 1990 [JP] Japan .................. 2-410167

[51] Int. Cl.$^5$ ............................. G11B 5/00
[52] U.S. Cl. ...................... 428/327; 428/328; 428/329; 428/332; 428/336; 428/480; 428/694 BA; 428/694 SL; 428/900; 428/910
[58] Field of Search ............ 428/327, 328, 329, 332, 428/336, 480, 694 BA, 694 SL, 900, 910

[56] References Cited

U.S. PATENT DOCUMENTS

| | | | |
|---|---|---|---|
| 4,761,327 | 8/1988 | Hamano et al. | 428/220 |
| 5,006,589 | 4/1991 | Sakamoto et al. | 524/430 |
| 5,096,773 | 3/1992 | Sakamoto | 428/323 |
| 5,100,719 | 3/1992 | Endo et al. | 428/213 |
| 5,252,388 | 10/1993 | Murooka et al. | 428/328 |

FOREIGN PATENT DOCUMENTS 0345644 12/1989 European Pat. Off. .

OTHER PUBLICATIONS

Japanese Laid-Open Patent Publication No. 02-60937 (Dia Foil K.K.) Mar. 1, 1990-Derwent Abstract.
Japanese Laid-Open Patent Publication No. 01-126340 (Teijin K.K.) May 18, 1989-Derwent Abstract.

Primary Examiner—Stevan A. Resan
Attorney, Agent, or Firm—Sherman and Shalloway

[57] ABSTRACT

A biaxially oriented polyester film for magnetic recording media, which comprises:

(A) 0.05 to 1.0% by weight of $\theta$-aluminum oxide or mixed ($\alpha+\gamma$) aluminum oxide having an average particle diameter in the range of from 0.02 to 0.3 $\mu$m and a specific surface area in the range of from 50 to 120 m$^2$/g, and (B) 0.01 to 1.5 % by weight of inert organic particles having an average particle diameter which is in the range of from 0.1 to 1.5 $\mu$m and greater than the average particle diameter of the aluminum oxide.

19 Claims, 1 Drawing Sheet

BIAXIALLY ORIENTED POLYESTER FILM FOR MAGNETIC RECORDING MEDIA CONTAINING THETA OR MIXED ALPHA PLUS GAMMA ALUMINUM OXIDE AND INERT ORGANIC PARTICLES

CROSS REFERENCE TO RELATED APPLICATION

This application is a continuation-in-part of application Ser. No. 07/806,288, filed Dec. 13, 1991 now U.S. Pat. No. 5,252,388.

DETAILED DESCRIPTION OF THE INVENTION

Figure 1:
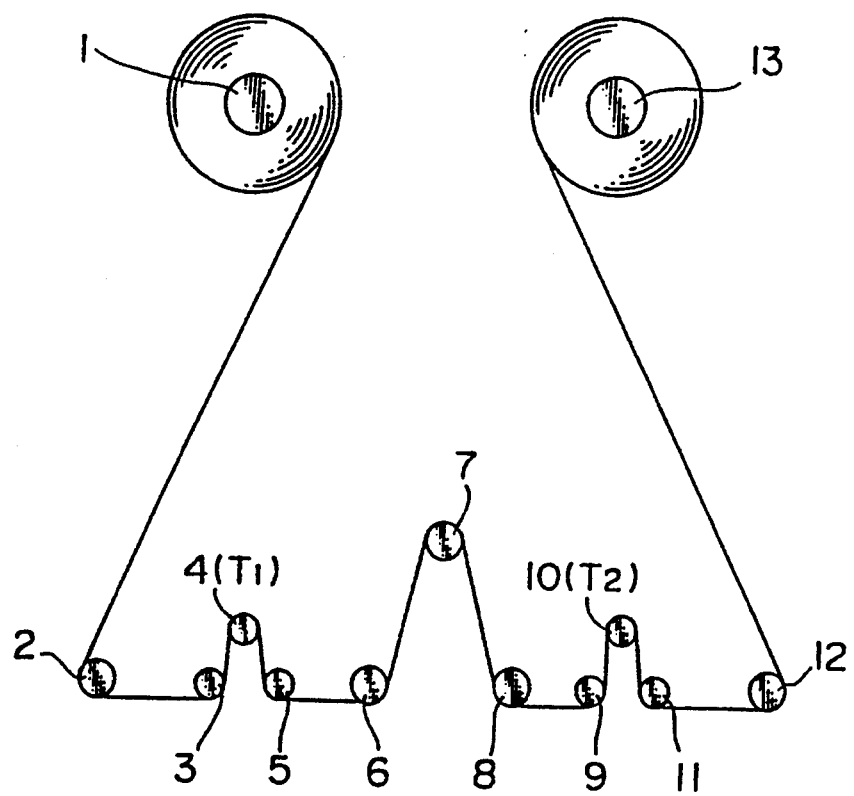

The present invention relates to a biaxially oriented polyester film for magnetic recording media. More specifically, it relates to a biaxially oriented polyester film for magnetic recording media, which is excellent in a variety of performances required of films for magnetic recording media, particularly abrasion resistance and scratch resistance.

Biaxially oriented polyester films typified by a polyethylene terephthalate film are extensively used for magnetic recording media owing to their excellent physical and chemical properties.

In biaxially oriented polyester films, their lubricity and abrasion resistance are crucial factors which influence not only the quality of accomplishment in the manufacturing and processing step but also their product quality.

When the biaxially oriented polyester film is poor in the above properties, for example, abrasion dust occurs or the film surface is scratched due to strong friction between a coating roll and the film surface during the formation of a magnetic tape by coating a magnetic layer on a biaxially oriented polyester film. Further, when such a magnetic tape is used as a VTR or data cartridge, abrasion dust or scratch also occurs when the tape is taken into a cassette at a high speed, which might cause drop-out of recorded data.

In the recent VTR cassette field, a metal guide of which the surface finish is insufficient or a plastic guide is sometimes used as a guide post fixedly provided in the cassette with the intention of reducing the manufacturing cost. This guide post has a very rough surface. Therefore, in a conventional method for improvement in lubricity and abrasion resistance, e.g., a method in which Inorganic particles of silicon oxide, titanium dioxide, calcium carbonate, talc, clay, calcined kaolin, etc., are incorporated (see Japanese Laid-Open Patent Publication No. 57762/1979), or a method in which fine particles containing calcium, lithium or phosphor are precipitated in the Polymerization system (see Japanese Patent Publication No. 32914/1977), the resultant magnetic tape provided with no back coating causes abrasion dust or scratch when the tape is taken into a cassette at a high speed, and recorded data is often dropped out.

U.S. Pat. No. 5,006,589 discloses a polyester film for magnetic recording media which contains 0.05 to 5% by weight of inactive inorganic particles (A) having a Mobs hardness of 6 or above and an average particle size of 0.005 to 1.0 μm and 0.01 to 2% by weight of inactive particles (B) having an average particle size which is greater than that of the particles (A) and in the range of 0.1 to 3.0 μm, the polyester film having an intrinsic viscosity in the range of 0.52 to 0.65.

As a material for the above inactive inorganic particles (A), $SiO_2$, $TiO_2$, $Al_2O_3$, SiC, zeolite, sellaite, TiC and titanium black are disclosed. Further, it is described that $Al_2O_3$ is particularly preferred, and there are disclosed α-, β-, γ-, κ-, ο-, δ-, η-, χ- and ρ-type $Al_2O_3$'s.

The above polyester film shows an effect on the guide posts employed for reducing in the manufacturing cost. However, when a conventional metal guide having a well-finished surface is used, the effect on improvement is insufficient. There is also a method in which inactive particles having a little greater size than the above inactive inorganic particles (A) are used in combination to overcome scratch caused by a metal guide having a well-finished surface. In this method, however, there is observed an adverse influence that abrasion dust newly occurs.

It is therefore an object of the present invention to provide a biaxially oriented polyester film for magnetic recording media.

It is another object of the present invention to provide a biaxially oriented polyester film for magnetic recording media, which is excellent in abrasion resistance and scratch resistance against not only a conventional metal guide having a well-finished surface but also a recent metal guide having a rough surface and a recent plastic guide, and which is also excellent in lubricity.

The other objects and advantages of the present invention will be apparent from the following description.

According to the present Invention, the above objects and advantages of the present invention are achieved by a biaxially oriented polyester film for magnetic recording media, which comprises:

(A) 0.05 to 1.0% by weight of θ-aluminum oxide having an average particle diameter in the range of from 0.02 to 0.3 μm and a specific surface area in the range of from 50 to 120 m²/g, and (B) 0.01 to 1.5% by weight of inert organic particles having an average particle diameter which is in the range of from 0.1 to 1.5 μm and greater than the average particle diameter of the θ-aluminum oxide.

FIG. 1 is a schematic view of an apparatus for measuring a running friction coefficient of a biaxially oriented polyester film for magnetic recording media.

The polyester which constitutes the biaxially oriented polyester film of the present invention is preferably selected from aromatic polyesters comprising aromatic dicarboxylic acids as a main acid component and aliphatic glycols having 2 to 10 carbon atoms as a main glycol component. As such a polyester, polyesters which are substantially linear and have film formability in the melt-molding are advantageous.

Examples of the aromatic dicarboxylic acids are terephthalic acid, naphthalenedicarboxylic acid, isophthalic acid, diphenoxyethanedicarboxylic acid, diphenyldicarboxylic acid, diphenyletherdicarboxylic acid, diphenylsulfonedicarboxylic acid, diphenylketonedicarboxylic acid, anthracenedicarboxylic acid, etc.

Examples of the aliphatic glycols are polymethylene glycols having 2 to 10 carbon atoms such as ethylene glycol, trimethylene glycol, tetramethylene glycol, pentamethylene glycol, hexamethylene glycol, decamethylene glycol, etc. and alicyclic diols such as cyclohexanedimethanol, etc.

As an aromatic polyester, preferred are those composed mainly of alkylene terephthalate and/or alkylene naphthalate.

For the above aromatic polyesters, not more than 20 mol % of the total amount of dicarboxylic acid components may be selected from the above aromatic dicarboxylic acids other than terephthalic acid and/or 2,6-naphthalenedicarboxylic acid, and also may be selected from aliphatic dicarboxylic acids such as adipic acid and sebacic acid and alicyclic dicarboxylic acids such as cyclohexane-1,4-dicarboxylic acid.

Further, not more than 20 mol % of the total amount of glycol components may be selected from the above glycols other than ethylene glycol, and also may be selected from aromatic diols such as hydroquinone, resorcin and 2,2-bis(4-hydroxyphenyl)propane; aliphatic diols having an aromatic ring such as 1,4-dihydroxydimethylbenzene; and polyalkylene glycols (polyoxyalkylene glycols) such as polyethylene glycol, polypropylene glycol and polytetramethylene glycol.

The polyester used in the present invention also includes polyesters in which not more than 20 mol %, based on the total amount of the dicarboxylic acid component and the oxycarboxylic acid component, of a component derived from an oxycarboxylic acid, e.g., an aromatic oxyacid such as hydroxybenzoic acid or an aliphatic oxyacid such as ω-hydroxycaproic acid is copolymerized or bonded.

Further, the polyester used in the present invention includes a polyester in which a polycarboxylic acid or a polyhydroxy compound having three or more functional groups such As trimellitic acid, pentaerythritol, etc., is copolymerized in such an amount that tile resultant polyester is substantially linear, e.g., not more than 2 mol % based on the total amount of acid components.

As an aromatic polyester in the present invention, particularly preferred are polyethylene terephthalate, Polyethylene-2,6-naphthalate and a copolymer composed of a dicarboxylic acid component of which at least 80 mol % is terephthalic acid and/or 2,6-dinaphthalenedicarboxylic acid and a glycol component of which at least 80 mol % is ethylene glycol.

The above polyesters are known per se, and can be produced by a known method.

The above polyesters preferably have an inherent viscosity, measured in an o-chlorophenol solution at 35° C., of about 0.4 to about 0.9.

The biaxially oriented polyester film of the present invention is a product containing $\theta$-aluminum oxide and inert particles having a greater particle diameter than the $\theta$-aluminum oxide in any one of the above-described polyesters.

The $\theta$-aluminum oxide has an average particle diameter in the range of from 0.02 to 0.3 $\mu$m, preferably in the range of from 0.03 to 0.25 $\mu$m.

When the above average particle diameter is smaller than 0.02 $\mu$m, it is impossible to form fine projections required for scratch resistance and prevention of occurrence of abrasion dust. On the other hand, when the average particle diameter is greater than 0.3 $\mu$m, agglomerates of primary particles are too large, and abrasion dust is liable to occur.

The $\theta$-aluminum oxide has a specific surface area in the range of from 50 to 120 $m^2/g$, preferably in the range of from 60 to 100 $m^2/g$.

When the above specific surface area is less than 50 $m^2/g$, the scratch resistance is improved, but abrasion dust is liable to occur, and further, a metal guide having a well-finished surface is frequently injured by the resultant film. On the other hand, when the specific surface area exceeds 120 $m^2/g$, the particle diameter is too small to form sufficient projections, and the scratch resistance is degraded although the occurrence of abrasion dust is decreased.

The $\theta$-aluminum oxide further preferably has an entire pore volume in the range of from 0.5 to 1.0 ml/g.

When the entire pore volume is less than 0.5 ml/g, the degree of particles being porous is too small, the affinity of the $\theta$-aluminum oxide to the polyester decreases, and abrasion dust is liable to occur. When the entire pore volume exceeds 1.0 ml/g, the particles are fragile and liable to crumble when the film is stretched for biaxial orientation, and it is difficult to form relatively large projections having an effect on scratch resistance against a metal guide having a well-finished surface.

The content of the $\theta$-aluminum oxide in the polyester is 0.05 to 1.0% by weight, preferably 0.1 to 0.6% by weight.

When the above content is less than 0.05% by weight, the effect produced by the fine particles contained decreases. When the above content exceeds 1.0% by weight, stacking of particles is observed, and abrasion dust is liable to occur.

The biaxially oriented polyester film of the present invention further contains inert particles having larger particle diameters than the $\theta$-aluminum oxide.

When the above inert particles are absent, the friction coefficient of the film against various guides is high, and not only the film is degraded in resistance to scratch and occurrence of abrasion dust, but also the handling of the film at the film production step is difficult. Further, when the film is used as a base film for magnetic recording media, the film shows poor running properties.

The inert particles can be selected from inert organic particles such as inert heat-resistant polymer particles.

Examples of the inert heat-resistant polymer particles are silicone resin particles, crosslinked acryl particles, crosslinked polystyrene resin particles, fluorine resin particles and polyimide particles.

The above inert organic particles may be used alone or in combination of two or more.

The inert organic particles preferably have an average particle diameter in the range of from 0.2 to 1.2 $\mu$m.

The inert organic particles are required to have a particle diameter greater than the $\theta$-aluminum oxide having an average particle diameter of 0.02 to 0.3 $\mu$m. The content of the inert organic particles in the polyester is 0.01 to 1.5% by weight, preferably 0.05 to 1.5% by weight, more preferably 0.05 to 1.0% by weight.

If desired, inert inorganic particles such as silicon dioxide, titanium oxide, talc, kaolin, calcium carbonate and $\alpha$-, $\theta$-, $\delta$-, $\gamma$-, $\eta$-, $\rho$-, $\kappa$- or $\chi$-aluminum oxide can be used.

The $\theta$-aluminum oxide the inert organic particles and, if desired, the inert inorganic particles may be incorporated and dispersed in the polyester by a conventional method known in the field of this art.

The biaxially oriented polyester film of the present invention can be produced, for example, by melt-extruding a polyester at a temperature ranging from the melting point of the polyester (Tm:°C.) to (Tm+70)°C. to obtain an unstretched film having an inherent viscosity of 0.35 to 0.9 dl/g, stretching monoaxially (in the width or length direction) the unstretched film at a stretch ratio of 2.5 to 5.0 at a temperature between (Tg−10)°C. and (Tg+70)°C. (Tg stands for the glass transition temperature of the polyester), and then stretching the resultant film at right angles with the above stretching direction (e.g., in the width direction when the unstretched film had been first stretched in the length direction) at a stretch ratio of 2.5 to 5.0 at a temperature between Tg (°C.) and (Tg+70)°C. In this case, the stretch ratio in terms of an area is 9 to 22, preferably 12 to 22. The biaxial stretching may be carried out at the same time or consecutively.

Further, the resultant biaxially oriented polyester film may be thermally set at a temperature between (Tg+70)°C. and Tm(°C.). For example, it is preferred that the polyethylene terephthalate film be thermally set at a temperature between 190° C. and 230° C. The time for the thermal setting is, for example, 1 to 60 seconds.

The biaxially oriented polyester film of the present invention preferably has, on the film surface, projections of which the size, number and distribution are suitable for achievement of the objects of the present invention. For this purpose, the projections satisfy the following relationship, $$-11.4x+4 < \log y < -10.0x+5$$

in which x is a distance (μm) in the height direction from a standard level and y is a number of projections (pieces/mm$^2$) counted when the projections are cut at a height of x,
provided that x is in the range of not less than 0.05 μm and that y is in the range of not less than 30/mm$^2$.

The biaxially oriented polyester film of the present invention preferably has a running friction coefficient (μk) of not more than 0.3.

The biaxially oriented polyester film of the present invention also preferably has a running friction coefficient increment (Δμk) of not more than 0.15.

The biaxially oriented polyester film of the present invention has a thickness, for example, in the range of from 4 to 100 μm.

Having excellent scratch resistance and abrasion resistance against any of a metal guide having a well-finished surface, a metal guide having an insufficiently finished surface and a plastic guide, the biaxially oriented polyester film of the present invention is very useful as a substrate film for magnetic recording media.

According to tile present invention, there is therefore provided a magnetic recording medium comprising the above biaxially oriented polyester film of the present invention and a magnetic layer formed thereon.

Further, a study of the present inventors has showed that the above objects of the present invention can be similarly achieved also by the use of mixed (α+γ) aluminum oxide in place of the θ-aluminum oxide.

According to the present invention, therefore, there is also provided a biaxially oriented polyester film for magnetic recording media, which comprises:

(A)' 0.05 to 1.0% by weight of mixed (α+γ) aluminum oxide having an average particle diameter in the range of from 0.02 to 0.3 μm and a specific surface area in the range of from 50 to 120 m$^2$/g, and (B)' 0.01 to 1.5% by weight of inert organic particles having an average particle diameter which is in the range of from 0.1 to 1.5 μm and greater than the average particle diameter of the mixed (α+γ) aluminum oxide.

In the above biaxially oriented polyester film, the above mixed (α+γ) aluminum oxide means aluminum oxide in which each particle includes an α-type crystal form and a γ-type crystal form, and it does not mean a mixture of α-type particles and γ-type particles.

The mixed (α+γ) aluminum oxide preferably has 3 to 30% by weight of an α-type crystal form and 70 to 97% by weight of a γ-type crystal form. More preferably, it has 10 to 25% by weight of an α-type crystal form and 75 to 90% by weight of a γ-type crystal form.

Similarly to the above θ-aluminum oxide, the mixed (α+γ) aluminum oxide has an average particle diameter of 0.02 to 0.3μ, preferably 0.03 to 0.25 μm, and a specific surface area of 50 to 120 m$^2$, preferably 60 to 100 m$^2$/g.

The mixed (α+γ) aluminum oxide also preferably has an entire pore volume in the range of from 0.5 to 1.0 ml/g.

It should be understood that the previous description of the biaxially oriented polyester film using θ-aluminum oxide can be applied to the above biaxially oriented polyester film directly or by replacing the θ-aluminum oxide with the mixed (α+γ) aluminum oxide, except for the above description in regard to the mixed (α+γ) aluminum oxide.

The biaxially oriented polyester film using the mixed (α+γ) aluminum oxide, provided by the present invention, is also naturally very useful as a film for magnetic recording media. Therefore, the present invention also provides a magnetic recording medium comprising this biaxially oriented polyester film and a magnetic layer formed thereon.

In the production of a magnetic recording medium, a magnetic recording layer may be formed on the biaxially oriented polyester film of the present invention as a substrate by a method in which, for example, a magnetic coating composition is prepared by kneading a magnetic powder such as ferromagnetic iron oxide (e.g., $\gamma-Fe_2O_3$ or Co-containing $\gamma-Fe_2O_3$) or a ferromagnetic metal powder (e.g., pure Fe and an iron alloy such as Fe—Ni or Fe—Ni—Co) with a binder, and coated on the biaxially oriented polyester film (nonmagnetic support). The biaxially oriented polyester film of the present invention is particularly suitable for use in magnet recording media of high quality containing a ferromagnetic iron oxide powder.

Magnetic recording media having a polyester film as a substrate have found extensive use, for example, in video tapes, audio tapes, computer tapes and floppy discs. In such applications, there has been an increasing demand for high density recording and small sizes, and accordingly, the polyester film as a substrate has been strongly required to have a flat surface, lubricity, excellent handlability and a small thickness.

The present invention will be further detailed by reference to Examples.

The physical property values and characteristics in the present specification including Examples were measured or defined as follows.

(1) Average particle diameter (DP):

Particles were measured for diameters with a centrifugal particle size analyzer (model CP-50 supplied by Shimadzu Corporation), and there was prepared a cumulative curve of particles of individual diameters and their amounts calculated on the basis of the resultant centrifugal sedimentation curve. In the cumulative curve, a particle diameter corresponding to a 50 mass percent was read, and the particle diameter value read was defined as an average particle diameter of the particles (see "Particle Size Measuring Technique", pages 242-247, 1975, issued by Nikkan Kogyo Press).

(2) Specific surface area and Entire pore volume:

Particles were measured for a specific surface area and an entire pore volume according to a BET method with Autosorb-1 supplied by Quantachrome Corp.

(3) Running friction coefficient ($\mu k$) of film:

A film was measured for a running friction coefficient as follows, using an apparatus shown in FIG. 1.

In FIG. 1, numeral 1 indicates an unwinding reel, numeral 2 indicates a tension controller, numerals 3, 5, 6, 8, 9 and 11 indicate free rollers, numeral 4 indicates a tension detector (inlet), numeral 7 indicates a fixed rod made of stainless steel SUS304 (outer diameter 5 mm$\phi$, surface roughness Ra=0.02 $\mu$m), numeral 10 indicates a tension detector (outlet), numeral 12 is a guide roller, and numeral 13 indicates a take-up reel.

Under an environment having a temperature of 20° C. and a humidity of 60%, a film cut to a width of ½ inch was allowed to run (frictionally) at a rate of 200 cm/minute in a contact with the fixed rod at an angle $\theta = (152/180)\pi$ radian (152°). When a tension $T_1$ at the inlet was adjusted to 35 g with the tension controller 2, and after the film ran 90 m, an outlet tension ($T_2$: g) was detected with the outlet tension detector, and the running friction coefficient ($\mu k$) was calculated on the basis of the following equation.

$$\mu k = (2.303/\theta)\log(T_2/T_1) = 0.868 \log(T_2/35)$$

(4) Surface roughness:

A film was measured for an Ra (centerline average roughness) according to JIS B 0601.

A chart (film surface roughness curve) was drawn with a needle-contacting type surface roughness tester (SURFCOM 3B supplied by Tokyo Seimitsu Co., Ltd.) with a needle radius of 2 $\mu$m under a load of 0.07 g. A portion having a measured length L was taken from the film surface roughness curve in the direction of its center line. The center line of this portion taken was assumed to be X axis and the direction of the longitudinal multiplication, Y axis, and the roughness curve was expressed as $\mu = f(x)$. The value (Ra; $\mu$m) given by the following equation was defined as a surface roughness.

$$Ra = \frac{1}{L} \int_0^L |f(x)| \, dx$$

In the present invention, the measuring length was set at 1.25 mm, and the measurement was made on 8 portions having the measuring length. The three largest measured values were excluded, and Ra was expressed in terms of an average of the remaining five measured values.

(5) Scratch resistance and abrasion resistance:

In the same apparatus as that shown in FIG. 1 and used for the measurement of the running friction coefficient $\mu k$, a film was allowed to run 200 m at a contact angle of 30° at a rate of 300 m/minute and at an inlet tension of 50 g. After the film was allowed to run as above, the film was evaluated on abrasion dust adhering to the fixed rod 7 and scratch occurred on the film surface.

In the above test, the following fixed rods were used:

Method A: a 6 $\phi$ film guide made of stainless steel SUS 304 and having a well-finished surface (surface roughness Ra=0.015 $\mu$m).

Method B: a 6 $\phi$ film guide prepared by cylindrically bending a SUS sintered plate and having a insufficiently finished surface (surface roughness Ra=0.15 $\mu$m)

Method C: a 6 $\phi$ film guide formed of a carbon black-containing polyacetal. <Evaluation on abrasion dust>
A: No abrasion dust was found.
B: Abrasion dust was slightly found.
C: Abrasion dust was clearly found.
D: Abrasion dust heavily adhered.
<Evaluation on scratch>
A: No scratch was found.
B: 1 to 5 scratches were found.
C: 6 to 15 scratches were found.
D: 16 or more scratches were found.

(6) Scratch resistance at a low-rate repetition:

In the same apparatus as that shown in FIG. 1 and used for the measurement of the running friction coefficient $\mu k$, a film was allowed to run on the fixed rod in a running length of 10 m reciprocatively 50 times. After the film was allowed to run as above, the film was evaluated on scratch resistance.

In the above test, the following fixed rods were used:

Method A: a 6 $\phi$ film guide made of SUS 304 and having a well-finished surface (surface roughness Ra=0.015 $\mu$m).

Method B: a 6 $\phi$ film guide prepared by cylindrically bending a SUS sintered plate and having a insufficiently finished surface (surface roughness Ra=0.15 $\mu$m)

Method C: a 6 $\phi$ film guide formed of a carbon black-containing polyacetal.
<Evaluation on scratch>
A: No scratch was found.
B: 1 to 5 scratches were found.
C: 6 to 15 scratches were found.
D: 16 or more scratches were found.

(7) Running friction coefficient increment ($\Delta \mu k$) of film:

In the same apparatus as that shown in FIG. 1 and used for the measurement of the running friction coefficient $\mu k$, a film having a length of 10 m was allowed to run at a rate of 2 m/minute repetitively 50 times. The friction coefficient when the film was allowed to run for the first time was taken as $\mu k_1$, and the friction coefficient when it was allowed to run for the fiftieth time was taken as $\mu k_{50}$. And the running friction coefficient increment $\alpha \mu k$ was calculated by the following equation.

$$\Delta \mu K = \mu K_{50} - \mu k_1.$$

(8) Method of measurement of projection distribution:

A three-dimensional (stereoscopic) image of a profile of projections on a film surface was formed with a three-dimensional roughness tester (SE-30K, supplied by Kosaka Laboratory Ltd.) under the conditions where the needle diameter was 2 $\mu$mR, the needle pressure was 30 mg, the measurement length was 1 mm, the sampling pitch was 2 $\mu$m, the cutoff was 0.25 mm, the magnification in the vertical direction was 20,000, the magnification in the horizontal direction was 200, and the scanning line number was 150.

A plane obtained by cutting the above profile with a plane at right angles with the thickness direction of the film so that the total area of cross sections of profiled projections was 70% of a measured area of the film was taken as a standard level (0 level). The number of projections counted when the profile was cut, in parallel with the plane at the standard level, with a plane apart from the plane at the standard level by a distance of x (μm) in the height direction of the projections was taken as y (pieces/mm²). The numbers y were read by increasing or decreasing x, and a projection distribution curve was prepared by plotting the numbers read to draw a graph.

EXAMPLES 1–16

Dimethyl terephthalate and ethylene glycol were polymerized according to a conventional method in the presence of manganese acetate as an ester interchange catalyst, antimony trioxide as a polymerization catalyst, phosphorous acid as a stabilizer and additives shown in Table 1 as a lubricant to give polyethylene terephthalate having an inherent viscosity of 0.62 (in o-chlorophenol, at 35° C.).

The pellets of the above polyethylene terephthalate were dried at 170° C. for 3 hours, and then fed to an extruder through a hopper. The pellets were melted at a melting temperature of 280 to 300° C., and the molten polymer was extruded onto a rotary cooling drum having a surface finish of about 0.3 s and a surface temperature of 20° C. through a die having a slit of 1 mm in the width to give an unstretched film having a thickness of 200 μm.

The above-obtained unstretched film was preliminarily heated to 75° C., and stretched at a stretch ratio of 3.6 between a low-speed roll and a high-speed roll by heating the film with one IR heater having a surface temperature of 900° C. and positioned 15 mm above the film. The stretched film was cooled rapidly, fed to a stenter and stretched at a stretch ratio of 3.9 in the width direction at 105° C. The resultant biaxially oriented film was thermally set at a temperature of 205° C. for 5 seconds to give a thermally-set biaxially oriented film having a thickness of 14 μm.

Separately, 100 parts by weight (to be abbreviated as "part" hereinafter) of γ—Fe₂O₃ and the following components were kneaded and dispersed in a ball mill for 12 hours.

| | |
|---|---|
| Polyester polyurethane | 12 parts |
| Vinyl chloride-vinyl acetate-maleic anhydride copolymer | 10 parts |
| α-alumina | 5 parts |
| Carbon black | 1 part |
| Butyl acetate | 70 parts |
| Methyl ethyl ketone | 35 parts |
| Cyclohexane | 100 parts | components were added:

| | |
|---|---|
| Fatty acid: Oleic acid | 1 part |
| Fatty acid: Palmitic acid | 1 part |
| Fatty acid ester: Amyl stearate | 1 part |

The resultant mixture was further kneaded for 15 to 30 minutes. Further, 7 parts of a 25% ethyl acetate solution of a triisocyanate compound was added, and the resultant mixture was dispersed at a high velocity under a shear force to prepare a magnetic coating liquid.

The above-obtained magnetic coating liquid 25 was coated on the above 14 μm thick polyester film such that the dry coating was 3.5 μm thick.

The coated polyester film was subjected to an orientation treatment in a direct current magnetic field, and dried at 100° C. The dried coated polyester film was subjected to a calendering treatment, and slit to a width of ½ inch to give a magnetic tape having a thickness of 17.5 μm.

Table 1 shows the properties and amount of the inert particles and the kind of polyester film used in each Example.

Table 2 shows the properties of the magnetic tapes obtained in the above manner in each Example.

TABLE 1

| Example | | 1 | 2 | 3 | 4 | 5 | 6 |
|---|---|---|---|---|---|---|---|
| Inert particles | | | | | | | |
| A | | | | | | | |
| Kind | | Al₂O₃ | Al₂O₃ | Al₂O₃ | Al₂O₃ | Al₂O₃ | Al₂O₃ |
| Specific surface area | m²/g | 75 | 85 | 75 | 75 | 75 | 75 |
| Entire pore volume | ml/g | 0.75 | 0.82 | 0.75 | 0.75 | 0.75 | 0.75 |
| Average particle diameter | μm | 0.20 | 0.21 | 0.20 | 0.20 | 0.20 | 0.20 |
| Amount added | % | 0.3 | 0.3 | 0.3 | 0.3 | 0.3 | 0.3 |
| Crystal form | | θ | (α + γ) | θ | θ | θ | θ |
| B | | | | | | | |
| Kind | | Silicone resin particles | Silicone resin particles | Crosslinked polystyrene resin particles | Crosslinked acryl particles | Polyimide particles | Fluorine resin particles |
| Average particle diameter | μm | 0.6 | 0.6 | 0.5 | 0.55 | 0.6 | 0.8 |
| Amount added | % | 0.12 | 0.12 | 0.08 | 0.08 | 0.12 | 0.05 |
| Example | | 7 | | 8 | 9 | 10 | 11 |
| Inert particles | | | | | | | |
| A | | | | | | | |
| Kind | | Al₂O₃ | | Al₂O₃ | Al₂O₃ | Al₂O₃ | Al₂O₃ |
| Specific surface area | m²/g | 75 | | 75 | 60 | 100 | 75 |
| Entire pore volume | ml/g | 0.75 | | 0.75 | 0.55 | 0.90 | 0.75 |
| Average | m | 0.20 | | 0.20 | 0.25 | 0.10 | 0.20 |

TABLE 1-continued

| | | | | | | | | |
|---|---|---|---|---|---|---|---|---|
| particle diameter | | | | | | | | |
| Amount added | % | 0.3 | | 0.3 | 0.3 | 0.3 | 0.1 | |
| Crystal form | | θ | | θ | θ | θ | θ | |
| B | | | | | | | | |
| Kind | | Silicone resin particles | Silicone resin particles | Silicone resin particles | Crosslinked polystyrene resin particles | Silicone resin particles | Silicone resin particles | Silicone resin particles |
| Average particle diameter | m | 0.6 | 0.9 | 0.6 | 1.1 | 0.6 | 0.6 | 0.6 |
| Amount added | % | 0.10 | 0.01 | 0.08 | 0.02 | 0.12 | 0.12 | 0.12 |

| Example | | 12 | 13 | 14 | 15 | 16 | | |
|---|---|---|---|---|---|---|---|---|
| Inert particles | | | | | | | | |
| A | | | | | | | | |
| Kind | | Al$_2$O$_3$ | Al$_2$O$_3$ | Al$_2$O$_3$ | Al$_2$O$_3$ | Al$_2$O$_3$ | | |
| Specific surface area | m$^2$/g | 75 | 75 | 75 | 75 | 75 | | |
| Entire pore volume | ml/g | 0.75 | 0.75 | 0.75 | 0.75 | 0.75 | | |
| Average particle diameter | μm | 0.20 | 0.15 | 0.20 | 0.20 | 0.20 | | |
| Amount added | % | 0.5 | 0.3 | 0.3 | 0.3 | 0.3 | | |
| Crystal form | | θ | θ | θ | θ | θ | | |
| B | | | | | | | | |
| Kind | | Silicone resin particles | Silicone resin particles | Silicone resin particles | Silicone resin particles | CaCO$_3$ | CaCO$_3$ | Silicone resin particles |
| Average particle diameter | μm | 0.6 | 0.8 | 0.4 | 0.6 | 0.8 | 0.6 | 0.8 |
| Amount added | % | 0.12 | 0.10 | 0.18 | 0.05 | 0.05 | 0.25 | 0.02 |

TABLE 2

| Example | 1 | 2 | 3 | 4 | 5 | 6 | 7 | 8 | 9 | 10 | 11 | 12 | 13 | 14 | 15 | 16 |
|---|---|---|---|---|---|---|---|---|---|---|---|---|---|---|---|---|
| Surface roughness Ra nm | 19 | 19 | 18 | 19 | 20 | 18 | 18 | 17 | 19 | 19 | 19 | 19 | 24 | 18 | 15 | 21 |
| Running friction coefficient | 0.19 | 0.19 | 0.21 | 0.22 | 0.21 | 0.19 | 0.18 | 0.20 | 0.19 | 0.19 | 0.19 | 0.19 | 0.18 | 0.20 | 0.19 | 0.21 |
| Scratch resistance and abrasion resistance at high rate | | | | | | | | | | | | | | | | |
| *Method A* | | | | | | | | | | | | | | | | |
| Abrasion resistance | A | A | A | A | A | A | A | A | A | A | A | A | A | A | A | A |
| Scratch resistance | A | A | A | A | A | A | A | A | A | A | A | A | A | A | A | A |
| *Method B* | | | | | | | | | | | | | | | | |
| Abrasion resistance | A | A | A | A | A | A | A | A | B | A | A | A | A | A | B | A |
| Scratch resistance | A | A | A | A | A | A | A | A | A | B | B | A | A | A | A | A |
| *Method C* | | | | | | | | | | | | | | | | |
| Abrasion resistance | A | A | A | A | A | A | A | A | A | A | A | A | A | A | A | A |
| Scratch resistance | A | A | A | A | A | A | A | A | A | A | A | A | A | A | A | A |
| Scratch resistance at low-rate repetition | | | | | | | | | | | | | | | | |
| *Method A* | | | | | | | | | | | | | | | | |
| Scratch resistance | A | A | A | A | A | A | A | A | A | A | A | A | A | A | A | A |
| *Method B* | | | | | | | | | | | | | | | | |
| Scratch resistance | A | A | A | A | A | A | A | A | A | A | A | A | A | A | A | A |
| *Method C* | | | | | | | | | | | | | | | | |
| Scratch | A | A | A | A | A | A | A | A | | | | | | | | |

TABLE 2-continued

| Scratch resistance | A | A | A | A | A | A | A | A |
|---|---|---|---|---|---|---|---|---|

EXAMPLES 17–19

Dimethyl 2,6-naphthalene dicarboxylate and ethylene glycol were polymerized according to a conventional method in the presence of manganese acetate as an ester inter-change catalyst, antimony trioxide as a polymerization catalyst, phosphorous acid as a stabilizer and additives shown in Table 1 as a lubricant to give polyethylene 2,6-naphthalene dicarboxylate having an inherent viscosity of 0.62 (in o-chlorophenol, at 35° C.).

The pellets of the above polyethylene 2,6-naphthalene dicarboxylate were dried at 170° C. for 6 hours, and then fed to an extruder through a hopper. The pellets were melted at a melting temperature of 300° to 310° C., and the molten polymer was extruded onto a rotary cooling drum having a surface finish of about 0.3 s and a surface temperature of 40° C. through a die having a slit of 1 mm in the width to give an unstretched film having a thickness of 260 μm.

The above-obtained unstretched film was preliminarily heated to 125° C., and stretched at a stretch ratio of 4.7 between a low-speed roll and a high-speed roll by heating the film with one IR heater having a surface temperature of 900° C. and positioned 15 mm above the film. The stretched film was cooled rapidly, fed to a stenter and stretched at a stretch ratio of 5.0 in the width direction at 145° C. The resultant biaxially oriented film was thermally set at a temperature of 205° C. for 5 seconds to give a thermally-set biaxially oriented film having a thickness of 11 μm.

The same magnetic coating liquid as used in Examples 1–16 was coated on the above 11 μm thick polyester film (PEN film) such that the dry coating was 3.5 μm thick.

The coated polyester films were subjected to an orientation treatment in a direct current magnetic field, and dried at 100° C. The dried coated polyester films were subjected to a calendering treatment, and slit to a width of ½ inch to give a magnetic tape having a thickness of 14.5 μm.

Table 3 shows the properties and amount of the inert particles and the kind of polyester film used in each Example.

Table 4 shows the properties of the magnetic tapes obtained in the above manner in each Example.

TABLE 3

| Example | | 17 | 18 | 19 |
|---|---|---|---|---|
| Inert particles | | | | |
| A | | | | |
| Kind | | Al₂O₃ | Al₂O₃ | Al₂O₃ |
| Specific surface area | m²/g | 75 | 85 | 75 |
| Entire pore volume | ml/g | 0.75 | 0.82 | 0.75 |
| Average particle diameter | μm | 0.20 | 0.21 | 0.20 |
| Amount added | % | 0.3 | 0.3 | 0.3 |
| Crystal form | | θ | (α + γ) | θ |
| B | | | | |
| Kind | | Silicone resin particles | Silicone resin particles | Silicone resin particles |

TABLE 3-continued

| Example | | 17 | 18 | 19 |
|---|---|---|---|---|
| Average particle diameter | μm | 0.6 | 0.6 | 0.5 |
| Amount added | % | 0.12 | 0.12 | 0.08 |

TABLE 4

| Example | 17 | 18 | 19 |
|---|---|---|---|
| Surface roughness Ra nm | 20 | 20 | 18 |
| Running friction coefficient | 0.19 | 0.19 | 0.21 |
| Scratch resistance and abrasion resistance at high rate | | | |
| Method A | | | |
| Abrasion resistance | A | A | A |
| Scratch resistance | A | A | A |
| Method B | | | |
| Abrasion resistance | A | A | A |
| Scratch resistance | A | A | A |
| Method C | | | |
| Abrasion resistance | A | A | A |
| Scratch resistance | A | A | A |
| Scratch resistance at low-rate repetition | | | |
| Method A | | | |
| Scratch resistance | A | A | A |
| Method B | | | |
| Scratch resistance | A | A | A |
| Method C | | | |
| Scratch resistance | A | A | A |

As is clearly shown in Tables 2 and 4, the biaxially oriented polyester film of the present invention not only has excellent lubricity as a substrate film for magnetic recording media but also has excellent abrasion resistance and scratch resistance against all of a metal tape guide having a well-finished surface, a metal tape guide having an insufficiently finished surface and a plastic tape guide. The biaxially oriented polyester film of the present invention has excellent properties as a substrate film for magnetic recording media.

What is claimed is:

1. A biaxially oriented polyester film for magnetic recording media, which comprises:
   (A) 0.05 to 1.0% by weight of θ-aluminum oxide having an average particle diameter in the range of from 0.02 to 0.3 μm and a specific surface area in the range of from 50 to 120 m²/g, and
   (B) 0.01 to 1.5% by weight of inert organic particles having an average particle diameter which is in the range of from 0.1 to 1.5 μm and greater than the average particle diameter of the θ-aluminum oxide.

2. The biaxially oriented polyester film of claim 1, wherein the θ-aluminum oxide has an average particle diameter in the range of from 0.03 to 0.25 μm.

3. The biaxially oriented polyester film of claim 1, wherein the θ-aluminum oxide has a specific surface area in the range of from 60 to 100 m²/g.

4. The biaxially oriented polyester film of claim 1, wherein the θ-aluminum oxide has an entire pore volume in the range of from 0.5 to 1.0 ml/g.

5. The biaxially oriented polyester film of claim 1, wherein the inert organic particles are inert heat-resistant polymer particles.

6. The biaxially oriented polyester film of claim 5, wherein the inert heat-resistant polymer particles are selected from the group consisting of silicone resin particles, crosslinked acryl particles, crosslinked polystyrene resin particles, fluorine resin particles and polyimide particles.

7. The biaxially oriented polyester film of claim 1, wherein the inert organic particles have an average particle diameter in the range of from 0.2 to 1.2 $\mu$m.

8. The biaxially oriented polyester film of claim 1, wherein the polyester comprises an aromatic dicarboxylic acid as a main acid component and an aliphatic glycol having 2 to 10 carbon atoms as a main glycol component.

9. The biaxially oriented polyester film of claim 1, which has a running friction coefficient ($\mu$k) of not more than 0.3.

10. The biaxially oriented polyester film of claim 1, which has a running friction coefficient increment ($\Delta\mu$k) of not more than 0.15.

11. The biaxially oriented polyester film of claim 1, which has projections satisfying the following relationship, $$-11.4x + 4 < \log y < -10.0x + 5$$

in which x is a distance ($\mu$m) in the height direction from a standard level and y is a number of projections (pieces/mm$^2$) counted when the projections are cut at a height of x, provided that x is in the range of not less than 0.05 $\mu$m and that y is in the range of not less than 30/mm$^2$.

12. The biaxially oriented polyester film of claim 1, which has a thickness in the range of from 4 to 100 $\mu$m.

13. A magnetic recording medium comprising the biaxially oriented polyester film recited in claim 1 and a magnetic layer formed thereon.

14. A biaxially oriented polyester film for magnetic recording media, which comprises:
(A)' 0.05 to 1.0% by weight of mixed ($\alpha + \gamma$) aluminum oxide having an average particle diameter in the range of from 0.02 to 0.3 $\mu$m and a specific surface area in the range of from 50 to 120 m$^2$/g, and
(B)' 0.01 to 1.5% by weight of inert organic particles having an average particle diameter which is in the range of from 0.1 to 1.5 $\mu$m and greater than the average particle diameter of the mixed ($\alpha + \gamma$) aluminum oxide.

15. The biaxially oriented polyester film of claim 14, wherein the mixed ($\alpha + \gamma$) aluminum oxide has an average particle diameter in the range of from 0.03 to 0.25 $\mu$m.

16. The biaxially oriented polyester film of claim 14, wherein the mixed ($\alpha + \gamma$) aluminum oxide has a specific surface area in the range of from 60 to 100 m$^2$/g.

17. The biaxially oriented polyester film of claim 14, wherein the mixed ($\alpha + \gamma$) aluminum oxide has an entire pore volume in the range of from 0.5 to 1.0 ml/g.

18. The biaxially oriented polyester film of claim 14, wherein the mixed ($\alpha + \gamma$) aluminum oxide is formed of 3 to 30% by weight of an $\alpha$-type crystal form and 70 to 97% by weight of a $\gamma$-type crystal form.

19. A magnetic recording medium comprising the biaxially oriented polyester film recited in claim 14 and a magnetic layer formed thereon.

* * * * *